May 4, 1965
C. M. RUSSELL
3,181,896
COUPLING NUT
Filed Oct. 24, 1962
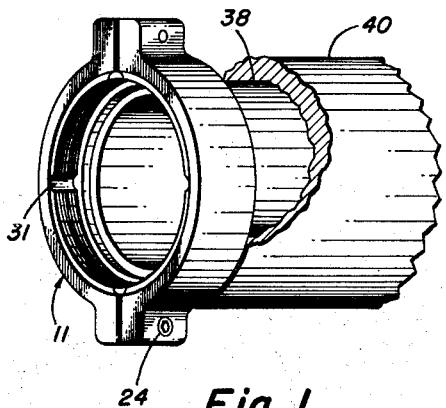
Fig. 1
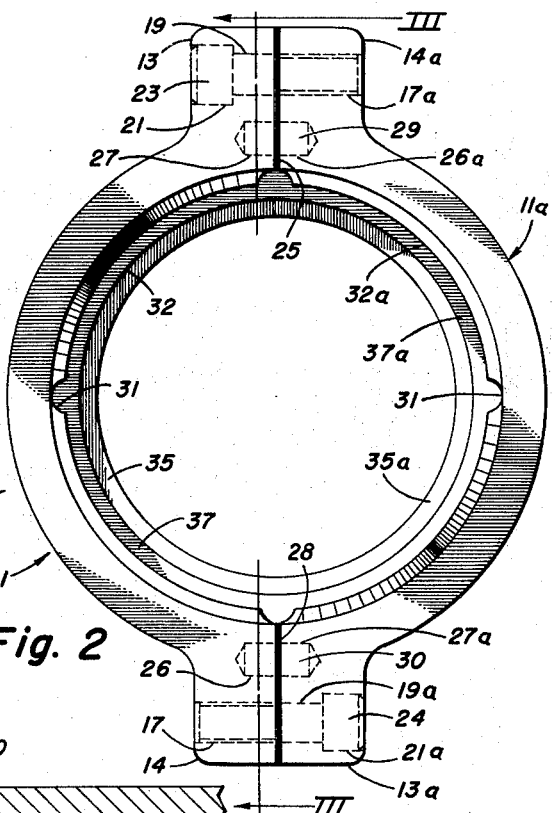
Fig. 2
Fig. 4
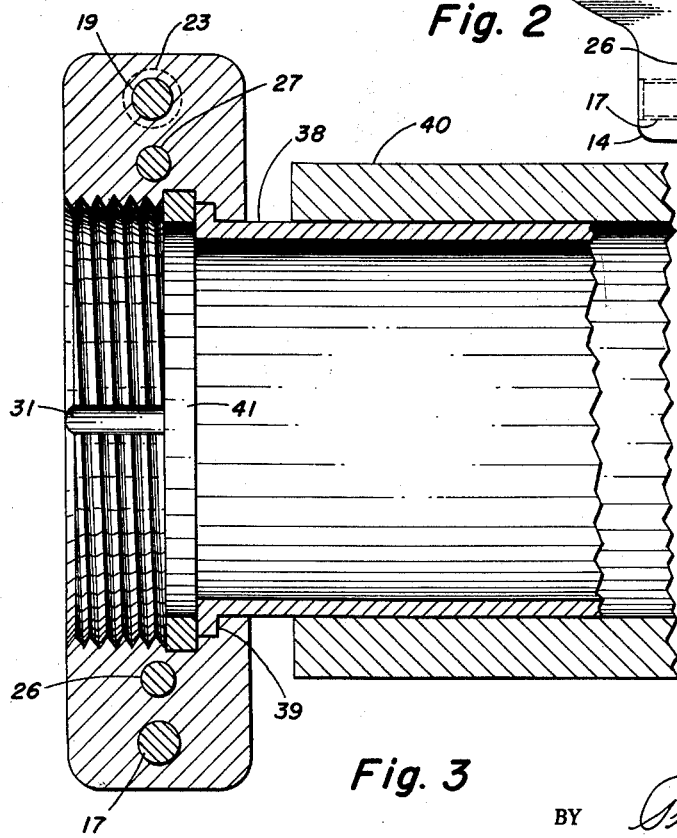
Fig. 3
INVENTOR
Clifford M. Russell
BY *Price and Heneveld*
ATTORNEYS United States Patent Office 3,181,896
Patented May 4, 1965

3,181,896
COUPLING NUT
Clifford M. Russell, 1475 Eastwood Drive,
Muskegon, Mich.
Filed Oct. 24, 1962, Ser. No. 233,293
2 Claims. (Cl. 285—15)

This invention relates to a nut for coupling hoses used in the tank truck industry or liquid bulk loading and unloading industry, and more particularly to a nut for sealingly coupling the flange of a hose to a nipple or male fitting.

This is a continuation-in-part application of my application entitled Coupling Nut, filed August 3, 1959, Serial No. 831,264 now abandoned.

Nut couplings of the type disclosed herein, used in the tank truck industry e.g. petroleum, for fluid bulk unloading are subject to very rough treatment. Therefore, a coupling of this type must be well constructed to have a life span of any length. Couplings of this type are used to connect hose flanges in the neighborhood of three inches in diameter. Since the connections must be liquid tight, it is necessary that the flange and male fitting be drawn tightly against each other in a manner to provide a liquid seal. Due to the size of the coupling nut it is necessary to use a tool of some description to secure such a connection. This tool is usually the first thing the truck driver can get his hands on, which will impact a blow to the ears of the coupling. In practice the means of tightening the coupling nut is by use of a hammer or pipe wrench which is wielded against the ears of the coupling nut. The same, rough, but effective method is used to loosen the nut. Also, when the male fitting and hose sleeve are uncoupled, the nut and hose are often dragged along the ground before the hose is again placed on the truck. Therefore, it can be seen that a coupling nut of this type is subject to very rough treatment and must be sturdy and rigid.

Since the hose and coupling nut of this type is used on a tank truck which makes several deliveries daily, the coupling nut is in repeated use. The nut is unfastened and fastened many times a day, in addition to the rough treatment received thereby. Consequently, the wear factor is high, and the life span is relatively short. Internal wear is greatly accelerated by abrasion of the threads and by the tendency of the parts to "rethread" each time they are connected, due to dirt in the threads. The nut is constantly exposed to dirt and other foreign matter.

After the relatively short life of the nut, proper connection and sealing becomes impossible, thereby making replacement necessary. Replacement of the conventional nut necessarily requires the removal of almost a foot of expensive hose since the nut is irremovably fitted around a flanged sleeve which is in turn irremovably fitted almost a foot into the hose. Consequently, after a short period of use, both the expensive nut and hose portion must be discarded.

In spite of the time and money spent in replacement, no one has been able heretofore to successfully substitute a nut which could be adjusted to account for the wear, or removable without cutting off a section of hose. If the nut is made thinner than usual, to allow circumferential contraction with wear, the nut cannot withstand the constant hammering with repeated tightening and loosening. Further, even if made of split sections, it must be able to seal the male fitting to the hose sleeve all around its periphery.

The characteristics of rigidity to withstand rough usage and proper sealing are normally inconsistent with the characteristics of split construction to allow removal, proper adjustability without thread binding and mismatching, and uniform circumferential contraction around the nut periphery.

It is therefore an object of this invention to provide a coupling nut which has a relatively thick, strong construction to withstand rough usage, is capable of remaining in the use even though the threads become somewhat worn, has a long life with repeated adjustability for wear, is capable of simple removal for replacement without sacrificing a section of hose, is capable of circumferential contraction around the periphery of the nut when adjusted, and which also inherently helps prevent thread wear by dirt and other foreign matter in the threads.

These and other objects and advantages in the practice of this invention will be more apparent from the illustration and description of a working embodiment of the invention, as hereinafter set forth.

In the drawings:

FIG. 1 is a perspective view of the nut as assembled to a hose.

FIG. 2 is a side elevational view of the coupling nut.

FIG. 3 is a cross-sectional view taken along the plane III—III of FIG. 2.

FIG. 4 is a side elevational view of the laminated shim showing a portion of the shim peeled back.

The coupling nut is designated generally as 10, and has two identical halves 11 and 11a held together by bolts 23 and 24.

The nut half 11 is semi-circular in shape, and near the ends thereof are projections or ears 13 and 14 which extend radially outwardly from the outer periphery. The ears extend outwardly a distance approximately 1½ times the thickness of the circular portion of the nut 11. Half nut 11a is identical to half nut 11 and has ears 13a and 14a which project outwardly in a manner similar to the ears 13 and 14. The inner surfaces of the ears are machined or cast to have mating surfaces, and form a complete nut when secured together. Thus, the inside surfaces of ears 13 and 14, and the inside surfaces of ears 13a and 14a mate to form a complete nut of circular shape adapted to engage a conventional male fitting. The half nuts, including ears, are made of heavy rigid material to withstand rough usage without breaking or bending.

The ears 14 and 14a have threaded apertures 17 and 17a respectively extending transversely therethrough. The ears 13 and 13a have apertures 19 and 19a, respectively, extending transversely therethrough and disposed so as to be aligned with threaded apertures 17 and 17a when the nut halves 11 and 11a are in mating position. The apertures 19 and 19a are counterbored at 21 and 21a, respectively, to provide means for countersinking the screws 23 and 24 in the ears 13 and 13a, respectively. It is necessary to countersink the screws to prevent their being smashed by hammering the nut with the tightening or loosening tool.

Disposed radially inwardly of the threaded apertures 17 and 17a are aligning holes 26 and 26a in the respective half nuts 11 and 11a. Also, disposed radially inwardly from the apertures 19 and 19a, and in alignment with the aligning holes 26 and 26a, are aligning holes 27 and 27a in the respective half nuts 11 and 11a.

Half nut 11 is provided with threads 32 on the inner periphery thereof, extending through a little more than half the width of the nut. The nut 11a is provided with threads 32a in a manner similar to the threads 32 of half nut 11. When half nut 11 and 11a are secured together the threads 32 and 32a form a continuous thread which is adapted to be threaded on a nipple or male fitting. The threads 32 and 32a have transverse grooves such as 31 formed throughout their lengths to provide means for any dirt or foreign matter on the threads to escape or work itself into the grooves. The grooves are machined to a depth which is equal to the outside diameter of the threads 32 and 32a. It has been found that these grooves, which are transverse to the threads and coaxial with the nut axis, are very important in actual usage not only to collect dirt and thereby prevent the threads from being chewed up and mismatching, but also to allow the otherwise rigid half nuts to provide proper thread engagement around the entire periphery of the nut assembly when adjusted, rather than at the middle of the half nuts, since this also prevents mismatching of the worn threads with the male fitting threads.

Immediately behind the threads 32 of the half nut 11 is a semi-annular gasket receiving groove 37. The gasket groove 37 has an outside diameter which is greater than the outside diameter of the threads 32. This arrangement affords a liquid tight seal when the nut is threaded onto a nipple or male fitting. This sealing gasket provides a tight seal in spite of the fact that transverse grooves 31 are cut into the threads. The more or less uniform circumferential contraction of the nut assembly with adjustment helps maintain this seal. Half nut 11a has a semi-annular gasket groove 37a which is similar to groove 37 of half nut 11. When half nut 11 and 11a are in mating engagement the gasket grooves 37 and 37a provide a continuous annular groove about the inner periphery of the coupling nut assembly 10.

Adjacent the gasket groove 37 is a flange shoulder 35. The flange shoulder 35 is of less outside diameter than the gasket groove 37, so that a proper seal may be had between the gasket and the flange member. Half nut 11a has a flange shoulder 35a which is similar to the flange shoulder 35. When half nut 11 and 11a are secured together in mating position the shoulders 35 and 35a form a continuous flange shoulder about the inner periphery of the coupling nut assembly 10.

FIG. 3 shows a hose sleeve 38. The hose sleeve 38 is provided with an outwardly turned flange 39 which is adapted to abut the flange shoulders 35 and 35a of the coupling nut assembly 10. The sleeve flange 39 is of a dimension so as to fit snugly within and against the shoulders 35 and 35a of the coupling nut assembly 10.

The hose sleeve 38 is adapted to be inserted within a hose 40. The hose 40 is clamped on the sleeve 38 by some well-known clamp means (not shown). Once these sleeves are inserted, they eventually become irremovable from the hose. Thus conventionally, the entire section of hose must be cut off to slip a new nut on and insert another sleeve. In this invention, the hose and sleeve are saved, and no new nut is required for a long period of time.

The identical half nuts 11 and 11a are secured together by machine screws 23 and 24. The machine screws 23 and 24 are inserted in the apertures 19 and 19a respectively of the half nuts 11 and 11a, and threaded into the threaded apertures 17 and 17a. The screws 23 and 24 may be Allen type screws so that an Allen wrench may be used for tightening the screws.

To assist in aligning the half nuts 11 and 11a when it is desirable to join them into a coupling nut assembly 10, aligning pins 29 and 30 are placed in the aligning holes 26 and 27 of half nut 11, or in the aligning holes 26a and 27a of half nut 11a. The aligning pins or dowels 29 and 30 have tapered ends, as shown in FIG. 2 to assist in aligning half nut 11 with respect to half nut 11a or vice versa should the pins be initially placed in aligning holes 26a and 27a.

Placed between the inside faces of the ears 13, 14 and 13a, 14a are wear compensation shims 25 and 28. The shims 25 and 28 have a total thickness of about ten thousandths of an inch, and are composed of five laminations of two thousandths each. Laminations of the shims may be peeled off to reduce the thickness thereof as shown in FIG. 4. The shims 25 and 28 are provided with apertures to allow the grooves and aligning pins or dowels to pass therethrough.

*Assembly*

Half nuts 11 and 11a are identical so any two half nuts can be obtained from stock to be assembled into a completed coupling nut assembly 10. With this in mind any two half nuts are taken from stock, and dowel pins 29 and 30 are placed in aligning holes 26, 27 or 26a, 27a. Shims 25 and 28 are then placed over the respective dowel pins 29 and 30. The aligning holes 26a and 27a of half nut 11a are brought into engagement with dowel pins 29 and 30, and the half nut 11a is then pressed into mating engagement with half nut 11. The dowel pins 29 and 30 align the aperture 19 with the threaded aperture 17a, and the aperture 19a with the threaded aperture 17. Thereafter, it is only necessary to insert the screws 23 and 24 in the apertures 19 and 19a, through the apertures in the shims 25 and 28, and tighten the screws in the threaded apertures 17 and 17a. When screws 23 and 24 have been tightened a finished coupling nut 10 results.

If the coupling nut assembly 10 is to be used on a new hose and hose sleeve, the nut can be assembled as described above, and the sleeve inserted through the coupling nut so that the sleeve flange 39 abuts against the coupling nut shoulders 35 and 35a. A gasket 41 can then be placed in the gasket groove 37, 37a and the coupling nut is ready for use. However, should the coupling nut 10 be replacing an old coupling nut, it is necessary that the nut halves 11 and 11a be assembled so that the sleeve flange 39 abuts against the sleeve shoulders 35 and 35a of the half nuts 11 and 11a. The hose 40 is clamped to the sleeve 38 a sufficient distance from the sleeve flange 39 so as to allow the half nuts 11 and 11a to be assembled on the sleeve 39. A new gasket 41 can then be inserted in the gasket groove 37, 37a of the two half nuts.

Should the threads 32, 32a of the coupling nut 10 become worn, it is a simple matter to remove the screws 23 and 24, and separate the half nuts 11 and 11a. The laminated shims 25 and 28 can then be removed, and since the shims are laminated in degrees of two thousandths, the desired thickness can be moved from the shims to take-up for the wear to the threads 32 and 32a. If the wear to the threads is extensive, both shims 25 and 28 may be entirely removed. Also, a portion of the shim 25 may be removed and the shim 28 remain intact, should the threads 32, 32a of the coupling adjacent shim 25 be worn more than adjacent shim 28. When the desired adjustment for wear has been made the nut halves 11 and 11a are reassembled. When shims are removed and the bolts are tightened to contract the nut assembly circumferentially, the first tendency for the rigid half nuts is to contract only at the middle of the half nuts on the sides of the male fitting, i.e. 90° from the ears. Thus, the worn threads adjacent the ears would not necessarily properly engage the adjacent male fitting threads and could readily become mismatched during connection and disconnection, especially if dirt is present. However, the grooves 31 allow a certain contractual flexibility to the rigid half nuts by allowing each half nut to bend around the groove in the center of the half nut as more tightening force is applied to the bolts. Thus, the grooves allow the ends of the half nuts to radially contract to provide a more or less uniform contraction around the periphery of the nut assembly, rather than just at two points in the centers of the half nuts. This draws the threads into optimum engagement all the way around the nut and male nipple so that the threads do not readily become mismatched due to only limited engagement. It will be seen that the grooves 31 may be more in number and placed at various angles. The use of the two grooves at the center of the half nuts has been found to serve adequately. The other two grooves adjacent the half nut junctures serve to scrape dirt from the threads and do not add to this second function of the central grooves. Thus, the grooves help make proper adjustment of the nut possible by both scraping dirt from the threads and allowing proper thread engagement. Should both shims 25 and 28 be removed, and the coupling be sloppy due to the wear of the threads, it is a simple matter to grind down the inside faces of the ears 13, 14 and 13a, 14a. If the same amount of material is taken off from each inside face the half nuts 11 and 11a still remain identical.

The half nuts 11 and 11a are constructed of a combination of aluminum and bronze which provides a material with excellent pipe fitting properties, and also a stronger coupling than many of the coupling nuts now on the market. This is true because of the strength properties added to the combination by including aluminum.

The many advantages of the coupling nut disclosed herein should be readily apparent. The coupling nut is constructed of two half nuts which are identical in shape and design, and therefore can be die cast, or machined by one operation or the same series of operation.

The coupling nut can be assembled to an old hose sleeve.

While a preferred embodiment of this invention has been described, it is conceivable that certain minor modifications and improvements may be made thereto. Such of these modifications and improvements as incorporate the principles of this invention are to be considered as included in the appended claims and the equivalents thereto.

I claim:

1. A heavy duty removable, adjustable hose connector capable of sealingly connecting a threaded male hose fitting directly to a sleeve and hose combination without additional fittings, comprising, a pair of identical half nuts; each of said half nuts having internal threads and a gasket retaining groove formed about its entire inner periphery to receive a gasket and seal the connection even with repeated adjustments, and shoulder means formed on said half nuts on the side opposite said threads to engage a flange on said sleeve; each of said half nuts having a pair of radially extending ears for mating with the ears of the other half nut; alignment means between said ears to match the threads of said half nuts; said ears having orifices therethrough receiving bolt connectors; a plurality of shim elements between said ears and receiving said bolts to allow repeated contractual adjustment of said half nuts to accommodate thread wear; a plurality of grooves formed in said threads, parallel with the axis of the assembled nut, and extending to a depth of substantially the base of said threads and extending axially from the wall of said groove adjacent said threads to the outer face of each half nut to scrape and collect dirt in said threads during connection and disconnection of said threads, and with at least one groove in each half nut being spaced 90° from the ears thereof to enable circumferential contraction of said half nut around the periphery thereof.

2. The connector in claim 1 wherein the heads of said bolts are countersunk into said ears to allow the ears to be hammered without bolt damage.

References Cited by the Examiner

UNITED STATES PATENTS

| 100,665 | 3/70 | Potter | 285—387 |
| 652,904 | 7/00 | Stroh | 285—387 |
| 670,235 | 3/01 | Irlbacher | 85—33 |
| 793,209 | 6/05 | Miller | 285—387 |
| 882,350 | 3/08 | Shaughnessy | 285-337 |
| 2,063,616 | 12/36 | Meyer | 285—354 |

FOREIGN PATENTS 499,834  1/39  Great Britain.

CARL W. TOMLIN, *Primary Examiner.*